United States Patent
Kwan et al.

(10) Patent No.: US 12,112,287 B1
(45) Date of Patent: Oct. 8, 2024

(54) AUTOMATED ESTIMATION OF RESOURCES RELATED TO TESTING WITHIN A SERVICE PROVIDER NETWORK

(71) Applicant: Amazon Technologies, Inc., Seattle, WA (US)

(72) Inventors: Yuk Lun Patrick Kwan, Bellevue, WA (US); Huang Li, Seattle, WA (US); Michael Ho, Seattle, WA (US); Gary Rittinger, Kent, WA (US); Kavitha Thiyaghu, Herndon, VA (US)

(73) Assignee: Amazon Technologies, Inc., Seattle, WA (US)

( * ) Notice: Subject to any disclaimer, the term of this patent is extended or adjusted under 35 U.S.C. 154(b) by 164 days.

(21) Appl. No.: 17/955,189

(22) Filed: Sep. 28, 2022

(51) Int. Cl.
G06Q 10/0631 (2023.01)
G06N 20/00 (2019.01)

(52) U.S. Cl.
CPC ....... G06Q 10/06313 (2013.01); G06N 20/00 (2019.01)

(58) Field of Classification Search
CPC .......................... G06Q 10/06313; G06N 20/00
See application file for complete search history.

(56) References Cited

U.S. PATENT DOCUMENTS

| | | | | |
|---|---|---|---|---|
| 6,167,352 A * | 12/2000 | Kanevsky | ...... | G01R 31/318371 714/33 |
| 6,546,506 B1 * | 4/2003 | Lewis | ...... | G06Q 10/06 717/124 |
| 7,752,055 B1 * | 7/2010 | Partezana | ...... | G06Q 30/0283 705/400 |
| 8,286,176 B1 * | 10/2012 | Baumback | ...... | G06F 9/5061 709/221 |
| 8,495,576 B2 * | 7/2013 | Ndem | ...... | G06F 11/3604 717/124 |

(Continued)

FOREIGN PATENT DOCUMENTS

CN 110796270 A * 2/2020

OTHER PUBLICATIONS

Luecht "Some Useful Cost-Benefit Criteria for Evaluating Computer-based Test Delivery Models and Systems" (2005) (https://www.testpublishers.org/assets/documents/Volum%207%20Some%20useful%20cost%20benefit.pdf) (Year: 2005).*

Primary Examiner — Sujay Koneru
(74) Attorney, Agent, or Firm — Lee & Hayes, P.C.

(57) ABSTRACT

This disclosure describes a test prediction service for predicting needed resources and associated costs for testing projects related to testing of new programs, services, etc., within a service provider network. The test prediction service uses a first machine learning model for predicting "hard costs" using data from a first data source that includes end-to-end test details such as associated resource and infrastructure use (costs) of the service provider network during previous end-to-end testing projects. A second machine learning model is used for predicting "soft costs" using data from a second data source that includes data, e.g., engineering headcount/hours spent developing the end-to-end testing and/or during previous end-to-end testing. The data is used to train the machine learning models. The test prediction service uses the trained machine learning models to generate estimated testing costs of new testing projects when a user enters project attributes for a new testing project.

12 Claims, 9 Drawing Sheets

(56) References Cited

U.S. PATENT DOCUMENTS

| | | | |
|---|---|---|---|
| 9,514,037 B1* | 12/2016 | Dow | G06Q 10/06315 |
| 10,182,104 B1* | 1/2019 | Canton | H04L 67/10 |
| 10,747,651 B1* | 8/2020 | Vanderwall | G06F 11/3684 |
| 2005/0172269 A1* | 8/2005 | Johnson | G06Q 10/00 |
| | | | 717/124 |
| 2006/0190417 A1* | 8/2006 | Hilkemeyer | G06Q 30/0206 |
| | | | 705/400 |
| 2006/0259443 A1* | 11/2006 | Vincenzini | G06Q 10/06 |
| | | | 705/400 |
| 2007/0016432 A1* | 1/2007 | Piggott | G06Q 10/06375 |
| | | | 700/99 |
| 2007/0088986 A1* | 4/2007 | Stark | G06F 11/3676 |
| | | | 714/E11.207 |
| 2008/0092120 A1* | 4/2008 | Udupa | G06F 11/3696 |
| | | | 717/124 |
| 2009/0217100 A1* | 8/2009 | Grechanik | G06F 11/368 |
| | | | 714/38.1 |
| 2012/0030679 A1* | 2/2012 | Ferdous | G06F 9/5044 |
| | | | 718/101 |
| 2014/0040867 A1* | 2/2014 | Wefers | G06F 11/3684 |
| | | | 717/131 |
| 2014/0214496 A1* | 7/2014 | Macbeath | G06Q 30/0283 |
| | | | 705/7.37 |
| 2015/0347970 A1* | 12/2015 | Kirtane | G06F 11/3664 |
| | | | 717/103 |
| 2016/0210555 A1* | 7/2016 | Murphy | G06N 5/04 |
| 2016/0321115 A1* | 11/2016 | Thorpe | G06F 11/3452 |
| 2016/0379125 A1* | 12/2016 | Bordawekar | G06F 9/5027 |
| | | | 706/12 |
| 2017/0060728 A1* | 3/2017 | Younger | G06F 11/368 |
| 2017/0091459 A1* | 3/2017 | Childress | G06F 21/577 |
| 2019/0171552 A1* | 6/2019 | Mitchell | G06N 20/00 |
| 2019/0317885 A1* | 10/2019 | Heinecke | G06F 11/3616 |
| 2020/0004667 A1* | 1/2020 | Seshadri | G06F 11/3672 |
| 2021/0286708 A1* | 9/2021 | Wang | G06F 11/3672 |
| 2022/0277219 A1* | 9/2022 | Tora | G06N 3/10 |
| 2022/0342663 A1* | 10/2022 | Barkaee | G06F 8/77 |
| 2023/0015477 A1* | 1/2023 | Verburg | G06N 20/00 |
| 2023/0030341 A1* | 2/2023 | Koh | G06F 40/186 |
| 2023/0057691 A1* | 2/2023 | Sharma | G06F 11/0745 |

* cited by examiner

500 →

```
┌─────────────────────────────────────────────────────────────────────────────┐
│  RECEIVE, BY A TEST PREDICTION SERVICE WITHIN A SERVICE PROVIDER NETWORK,   │
│  INFORMATION RELATED TO END-TO-END TESTING OF A NEW COMMERCE PLATFORM       │
│  WITHIN THE SERVICE PROVIDER NETWORK PRIOR TO LAUNCHING OF THE NEW          │
│  COMMERCE PLATFORM WITHIN THE SERVICE PROVIDER NETWORK                      │
│                                                                             │
│                                      502                                    │
└─────────────────────────────────────────────────────────────────────────────┘
                                       │
                                       ▼
┌─────────────────────────────────────────────────────────────────────────────┐
│  DETERMINE, BY THE TEST PREDICTION SERVICE, NEEDED FIRST RESOURCES FOR THE  │
│  END-TO-END TESTING OF THE NEW COMMERCE PLATFORM PRIOR TO LAUNCHING OF      │
│  THE NEW COMMERCE PLATFORM, WHEREIN THE TEST PREDICTION SERVICE UTILIZES    │
│  A FIRST MACHINE LEARNING ALGORITHM FOR THE DETERMINING                     │
│                                                                             │
│                                      504                                    │
└─────────────────────────────────────────────────────────────────────────────┘
                                       │
                                       ▼
┌─────────────────────────────────────────────────────────────────────────────┐
│  DETERMINE, THE TEST PREDICTION SERVICE, NEEDED SECOND RESOURCES FOR THE    │
│  END-TO-END TESTING OF THE NEW COMMERCE PLATFORM PRIOR TO LAUNCHING OF      │
│  THE NEW COMMERCE PLATFORM, WHEREIN THE TEST PREDICTION SERVICE UTILIZES    │
│  A SECOND MACHINE LEARNING ALGORITHM FOR THE DETERMINING                    │
│                                                                             │
│                                      506                                    │
└─────────────────────────────────────────────────────────────────────────────┘
                                       │
                                       ▼
┌─────────────────────────────────────────────────────────────────────────────┐
│  BASED ON (I) THE INFORMATION RELATED TO THE NEW COMMERCE PLATFORM WITHIN   │
│  THE SERVICE PROVIDER NETWORK AND (II) THE FIRST AND SECOND NEEDED          │
│  RESOURCES FOR TESTING OF THE NEW COMMERCE PLATFORM PRIOR TO LAUNCHING      │
│  OF THE NEW COMMERCE PLATFORM, PREDICT, BY THE TEST PREDICTION SERVICE,     │
│  AN ESTIMATED COST ASSOCIATED WITH (I) THE NEEDED FIRST RESOURCES TO        │
│  PERFORM THE TESTING OF THE NEW COMMERCE PLATFORM AND (II) THE NEEDED       │
│  SECOND RESOURCES TO PERFORM THE TESTING OF THE NEW COMMERCE PLATFORM       │
│                                                                             │
│                                      508                                    │
└─────────────────────────────────────────────────────────────────────────────┘
```

FIG. 5

AUTOMATED ESTIMATION OF RESOURCES RELATED TO TESTING WITHIN A SERVICE PROVIDER NETWORK

BACKGROUND

Service providers offer cloud-based services via service provider networks to fulfill user's computing-service needs without the users having to invest in and maintain computing infrastructure required to implement the services. These service providers are generally in the form of on-demand computing platforms that may provide network-based computing resources and functionality to implement various types of cloud-based services, such as, for example, scalable-storage services, computer-processing services, and so forth. In some examples, developers may utilize services offered by the service provider to run the systems and/or applications using virtual services (or "instances") provisioned on various configurations of hardware-based resources of a cloud-based service.

In some service providers, there may be tens or hundreds of services interacting with each other to form a complex billing platform to orchestrate different billing workflows to support, generate and audit billing artifacts for the service providers' users. When a service provider launches new features and programs for its customers, a series of end-to-end testing needs to be performed to ensure the service provider's features are working as expected. On average, the service provider may execute approximately ten thousand end-to-end tests per month. Such end-to-end testing may be responsible for a huge number of personnel, along with their time and efforts, as well as a huge use of the service provider's infrastructure and computing resources.

Currently, end-to-end testing focuses on creating test cases and validating features to support anew program or service's launch. Generally, to support end-to-end testing, only required headcount and times are provided but usage of other resources of the service provider network are not considered when evaluating overall costs of testing. These overall costs should include the number of personnel, along with their time and efforts, as well as a usage of the service provider's infrastructure and resources, e.g., technological costs such as, for example, computing resource usage, storage usage, latency issues caused by testing, etc. Currently, there is not a way to collect and learn from previous testing projects to provide a data driven overall testing analysis of overall costs for future testing projects, where the overall costs include the number of personnel, along with their time and efforts, as well as a usage of the service provider's infrastructure and resources, e.g., technological costs such as, for example, computing resource usage, storage usage, latency issues caused by testing, etc.

BRIEF DESCRIPTION OF THE DRAWINGS

The detailed description is set forth below with reference to the accompanying figures. In the figures, the left-most digit(s) of a reference number identifies the figure in which the reference number first appears. The use of the same reference numbers in different figures indicates similar or identical items. The systems depicted in the accompanying figures are not to scale and components within the figures may be depicted not to scale with each other.

FIG. 5 a flow diagram of an example method for automatically predicting and estimating needed resources and estimating associated costs associated with testing of new programs, services, features, etc. and associated commerce platform entities within an on-demand computing platform, e.g., the service provider network of FIG. 1.

DETAILED DESCRIPTION

Figure 1:
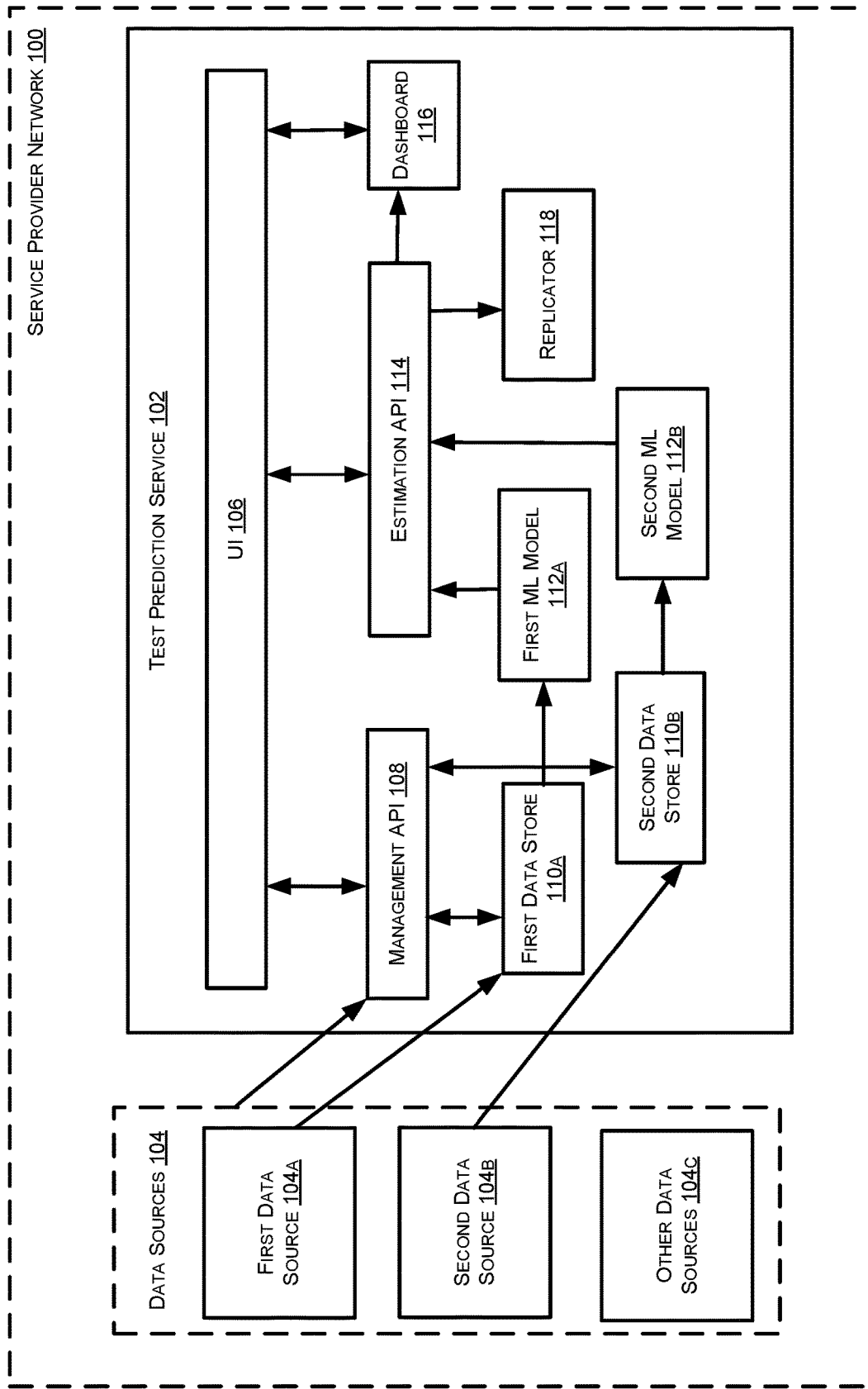
FIG. 1 schematically illustrates a system-architecture diagram of an example service provider network that includes a test prediction service that provides an automated process for predicting and estimating needed resources and estimating associated costs associated with testing of new programs, services, features, etc. and associated commerce platform entities within a service provider network.

This disclosure describes, at least in part, techniques and architecture that provide an automated estimation of needed resources related to testing within a network, e.g., a service provider network. A test prediction service described herein provides an automated process for predicting and estimating needed resources and estimating associated costs associated with testing of new programs, services, features, etc. and associated commerce platform entities within a service provider network, especially prior to launching of such new programs, service, features, etc. and associated commerce platform entities.

In configurations, a test prediction service is provided within a service provider network. The test prediction service provides application programming interfaces (APIs) for data import and a user interface (UI) for user access to view a dashboard on past and future testing resource requirements.

At a high level, the test prediction service uses one or more machine learning (ML) models to collect information from previous testing projects. In some configurations, the test prediction service uses two machine learning models to collect information from previous testing projects. A first ML model may be used for "hard costs" using data from a first data source or data store that includes end-to-end test details as a feature and associated resource and infrastructure use (costs) of the service provider network during the end-to-end testing. A second ML model may be used for "soft costs" using data from a second data source or data store that includes data entity attributes related to the testing, e.g., engineering headcount/hours spent developing the endto-end testing and/or during the end-to-end testing. This data may be used to train the ML models in the test prediction service to generate overall needed resources and associated overall or total costs for future testing projects.

The test prediction service may use the trained ML model(s) to generate the total testing costs of a new testing project when a user enters project attributes. The test prediction service processes these attributes and predicts the needed resources and/or associated costs of different test scenarios based on the trained machine learning models from the test prediction service.

The test prediction service may also provide a dashboard for displaying results to a user. The dashboard provides a comprehensive view for the needed resources and/or total test costs for both historical and future test projects. The dashboard shows users a trend of the needed resources and associated costs and factors to adjust to reduce the amount of needed resources and/or total costs.

In configurations, the test prediction service may utilize two ML models. The first ML model may utilize a first data store as a source of data for providing end-to-end test details as a feature and corresponding testing bill amounts as a label. The second ML model may utilize a second data store and its data as a feature and an engineering headcount with associated hours spent for the engineering head account as a label.

Both ML models may be trained with historical data gathered from the two data stores. If the user only needs a rough prediction for a resource bill amount without needing to run extremely complicated test cases, the user may simply request such a rough prediction.

For the first ML model, which may be trained and validated using a first data type from the first data store, a user may input feature data to the first ML model to obtain an estimated amount of services, resources, infrastructure, etc., provided by the service provider network and associated cost amount before actually running a test. The user may use the second model, which may be trained and validated using a second data type, to estimate an amount of engineering, e.g., human effort, needed to launch a seller of record (SoR) based on the SoR's attributes before actually running a test. This second ML model may help program managers better prepare and estimate their launch schedules by providing an initial estimate of human hours needed for executing the test. The estimation may also include human hours needed to develop and/or select a test.

Both ML models may be continuously trained as more data is generated during testing procedures and provided to the two data stores. In configurations, other data stores and/or sources may be utilized to provide input data for the two ML models and/or for training the two ML models.

In configurations, the test prediction service may include data management that provides management APIs to manage testing data. The testing service may use the management APIs to create, read, update and delete data from the data stores. Additionally, the test prediction service may include a dashboard that provides a dashboard view for users for historical costs of tests and future estimations of future tests.

More particularly, the first type of data from the first data store may be utilized to train and validate the first ML model and this first ML model may be utilized to predict a test cost for a particular user. Generally, the first data store may include many years of data related to thousands of tests that have been executed within the service provider network. Many test cases already cover a wide variety of use cases for testing new programs, services, features, etc. within the service provider network. Thus, the data from this first data store may be exported and features may be extracted using a ML model in order to predict bill amounts that may be generated by future tests. The ML model may be trained, validated and deployed on a testing platform of the service provider network in order to make the future predictions.

Predicting a bill amount related to resources of the service provider network used during the execution of a test may be a common use for such data. Complicated tests may often fail or take extremely long periods of time before finishing the testing process. Thus, this first model may be trained using all the successful test case data collected from past test cases and may provide a quick prediction of a bill amount for resources used by a future test case that a user desires to execute.

A known ML model such as, for example, AutoGluon, may be leveraged to automatically create a tabular regression model to predict a bill amount created using the first type of data. AutoGluon-Tabular provides access to many best practices used by expert data scientists through a user-friendly API and was designed with the following key principles: Simplicity: Users should be able to train classification and regression models and deploy them with a few lines of code; Robustness: Users should be able to provide raw data without any feature engineering or data manipulation; Predictable-timing: Users should be able to specify a time budget and get the best model under that time constraint; and Fault-tolerance: Users should be able to resume training when interrupted and be able to inspect all intermediate steps Autogluon-tabular may automatically create a complex ensemble learning model for the user to use without needing any human input. This Autogluon-tabular model may be trained with the test data from the first data store from the past tests in order to predict future resource needs and associated costs, e.g., technological costs such as, for example, computing resource usage, storage usage, latency issues caused by testing, etc. In configurations, this data may be preprocessed and converted into comma separated value (CSV) format to be input into the Autogluon model. Each time another test case successfully creates a bill using this first ML model, the Autogluon-tabular model may be further trained with the new data. Additionally, users may be asked to submit feedback based on whether the Autogluon-tabular model correctly predicted the bill amounts for their executed test cases. Thus, the first ML model's performance may be continuously improved.

With enough data points, the Autogluon-tabular model may be able to predict very complicated use cases that are difficult to run through the first ML model. Preprocessing the data, e.g., eliminating or adding data based on various thresholds such as, for example, upper bounds or lower bounds (e.g., eliminating outlier points) are important to training ML models. There may be complex test cases that fail execution halfway and thus, for such test cases there is no bill amount even though a successful instance may have resulted in a bill. Thus, such data points need to be omitted or edited with correct data.

In configurations, the data format for input into the ML model may be such that features may include project name, test JSON string, test step count (e.g., a number of steps in a test), a bill run step in JSON (e.g., a bill was generated: yes or no, true or false), a customer name, and a bill amount. A label may include an infrastructure cost, e.g., an amount of the infrastructure (e.g., network service provider network resources, services, etc.) that is used, where the cost for use of such infrastructure may be attributed to the use. Additionally, Autogluon may be utilized to pick the most accurate algorithm from, for example, linear regression, logistic regression, K-nearest neighbors, support vector machines, naïve bayes, decision tree, random forest, or K-means clustering.

The second type of data from the second data store may be utilized to train and validate the second ML model and this second ML model may be utilized to predict a needed amount of resources and a cost of launch for new program, service, feature and/or other type of commerce platform entity within the service provider network. For example, for the second model, tracking and recording of data may begin based on testing a specific seller of record (SoR) or other commerce platform entities to calculate an expected amount work for testing a launch for a commerce platform entity. The testing data may be leveraged from the second data store to estimate an amount of engineering hours, e.g., a number of engineers (humans and associated hours) required to configure commerce platform services for a launch of a new program, service, feature, or other commerce platform entity. This data may be taken and processed and then fed into the second ML model to calculate a needed amount of resources and a cost of launch for a certain type of commerce platform entity. When a user, such as, for example, a program manager or a quality assurance engineer, wishes to estimate an amount of work needed to launch a SoR, the user may input the SoR attributes to the model and receive an estimate from the second ML model for testing the SoR prior to launch of the SoR.

As with the first ML model, a known ML model such as, for example, Autogluon, may be leveraged to automatically create a tabular regression model to predict a bill amount created using the second type of data. Autogluon-tabular may automatically create a complex ensemble learning model for the user to use without needing any human input. This Autogluon-tabular model may be trained with the test data from the second data store from the past tests in order to predict future resource needs (e.g., human headcount and/or associated hours) and associated costs. In configurations, this data may be preprocessed and converted into comma separated value (CSV) format to be input into the Autogluon model. Each time another test case successfully creates a bill using this second ML model, the Autogluon-tabular model may be further trained with the new data. Additionally, users may be asked to submit feedback based on whether the Autogluon-tabular model correctly predicted the bill amounts for their executed test cases. Thus, the first ML model's performance may be continuously improved.

With enough data points, the Autogluon-tabular model may be able to predict very complicated use cases that are difficult to run through the second ML model. Preprocessing the data, e.g., eliminating or adding data based on various thresholds such as, for example, upper bounds or lower bounds (e.g., eliminating outlier points) are important to training ML models. There may be complex test cases that fail execution halfway and thus, for such test cases there is no bill amount even though a successful instance may have resulted in a bill. Thus, such data points need to be omitted or edited with correct data.

In configurations, the data format for input into the ML model may be such that features may include project name, test JSON string, test step count (e.g., a number of steps in a test), a bill run step in JSON (e.g., a bill was generated: yes or no, true or false), a customer name, and a bill amount. A label may include an infrastructure cost, e.g., an amount of the infrastructure (in this case human headcount and/or associated hours) that is used, where the cost for use of such infrastructure may be attributed to the use. Additionally, Autogluon may be utilized to pick the most accurate algorithm from, for example, linear regression, logistic regression, K-nearest neighbors, support vector machines, naïve bayes, decision tree, random forest, or K-means clustering.

Once one or both of the estimated bills, e.g., estimated needed resources (e.g., technological costs such as, for example, computing resource usage, storage usage, latency issues caused by the testing, etc.) and/or an amount of engineering, e.g., human effort, from both ML models are complete, the total testing costs of a new testing project may be generated based on the user entered project attributes of a new program, service, feature or other commerce platform. Commerce platform as used herein may refer to a program, service, feature, etc., provided by the service provider network, as well as a commerce entity, seller of record (SoR), etc., operating within the service provider network.

The results may be presented, e.g., displayed, to the user on a dashboard. The dashboard provides a comprehensive view for the needed resources and/or total test costs for both historical and future test projects. The dashboard shows the user a trend of the needed resources and associated costs and factors to adjust to reduce the amount of needed resources and/or total costs for a particular test project. In configurations, the user may be presented with the results in additional ways such as email notifications, other visual notifications, audible notifications, etc.

Thus, the techniques and architecture described herein provide for automatic estimation of needed resources and associated costs for end-to-end testing within a service provider network when a new program, service, feature, or other commerce platform is introduced within the service provider network. The testing may be performed prior to launch of the new program, service, feature, or other commerce platform. The estimation and prediction may allow for managing risk by prioritizing lower cost tests and avoiding more investment in riskier and higher priced new programs, services, etc., based partly on the estimated test costs. The estimation may also allow for scheduling usage of programs and services, e.g., computing resources, storage resources, etc., of the service provider network. The estimation and prediction may also allow for adding and/or removing tests within a test project. Thus, a risk/reward situation arises where based on the estimations and predictions, one may decide how to proceed with projects, if at all, whether testing projects need to be modified, and how much programs and services, e.g., computing resources, storage resources, etc., of the service provider network will be consumed and impacted by testing projects.

Certain implementations and embodiments of the disclosure will now be described more fully below with reference to the accompanying figures, in which various aspects are shown. However, the various aspects may be implemented in many different forms and should not be construed as limited to the implementations set forth herein. The disclosure encompasses variations of the embodiments, as described herein. Like numbers refer to like elements throughout.

FIG. 1 illustrates a system-architecture diagram of an example service provider network 100. The service provider network 100 may comprise servers (not illustrated) that do not require end-user knowledge of the physical location and configuration of the system that delivers the services. Common expressions associated with the service provider network may include, for example, "on-demand computing," "software as a service (SaaS)," "cloud services," "data centers," and so forth. Services provided by the service provider network 100 may be distributed across one or more physical or virtual devices.

As may be seen in FIG. 1, the service provider network 100 includes a test prediction service 102. The service provider network 100 also includes data sources 104. The data sources 104 include a first data source 104a that provides a first data, a second data source 104b that provides a second data, and other data sources 104c, collectively, that provide other data. In configurations, the data sources 104 may be testing services within the service provider network 100.

In configurations, the test prediction service 102 includes a user interface 106 that allows a user to interact with the test prediction service 102. The test prediction service 102 also includes a management application programming interface (API) 108 that manages data from the data sources 104 and data stores 110a, 110b, as will be described further herein. In configurations, the test prediction service 102 may use the management API 108 to create, read, update and delete data from the data stores 110a, 110b.

The data stores 110a, 110b store data from the data sources 104. In configurations, first data store 110a stores first data from the first data source 104a and second data store 110b stores second data from the second data source 104b. In configurations, the first data store 110a and the second data store 110b may be a single data store. The first data may comprise data related to previous end-to-end tests related to test projects previously executed within the service provider network 100, e.g., executed by a testing service associated with the first data source 104a. For example, the first data may comprise, for example, services of the service provider network 100 used during a test project, resources of the service provider network 100 used during a test project, infrastructure of the service provider network 100 used during a test project, etc., and associated cost amounts for a new program, service, feature and/or other type of commerce platform entity within the service provider network 100 that was tested during a test project previously executed within the service provider network 100. The second data may comprise data related to previous end-to-end tests related to test projects previously executed within the service provider network 100, e.g., executed by another testing service associated with the second data source 104b. For example, the second data may comprise, for example, an amount of engineering, e.g., human effort, and associated hours used during a test project, and associated cost amounts for a new program, service, feature and/or other type of commerce platform entity within the service provider network 100 that was tested during a test project previously executed within the service provider network 100.

The test prediction service 102 further includes a first machine learning (ML) model 112a and a second ML model 112b. As will be described further herein, the first ML model 112a may be trained and validated using first data from the first data store 110a and the second ML model 112b may be trained and validated using second data from the second data store 110b.

The test estimation API also includes an estimation API 114. In configurations, the estimation API 114 may utilize results from the ML models 112a, 112b to provide one or more estimated bills for a test project based on attributes of the test project input into the ML models 112a, 112b.

The test prediction service 102 also includes a dashboard 116 that provides a dashboard view for users for historical costs of tests, both past and current tests, and future estimations of future tests.

In configurations, the test prediction service 102 includes a replicator 118. The replicator 118 may replicate results of the one or more estimated bills from the estimation API 116 across multiple segments of the service provider network 100. In configurations, the multiple segments may represent different geographical regions.

The test prediction service 102 uses the ML models 112a, 112b to collect information from previous testing projects. The first ML model 112a may be used for "hard costs" using first data from the first data source 104a, (which may be located in the first data store 110a) that includes end-to-end test details as a feature and associated resource and infrastructure use (costs) of the service provider network 100 during end-to-end testing of previous test projects. For example, the hard costs, e.g., technological costs, may include services of the service provider network 100 used during a test project, resources of the service provider network 100 used during a test project, infrastructure of the service provider network 100 used during a test project, etc., and associated cost amounts for a new program, service, feature and/or other type of commerce platform entity within the service provider network 100 that is tested during a test project within the service provider network 100.

The second ML model 112b may be used for "soft costs" using second data from the second data source 110b (which may be located in the second data store 110b) that includes data entity attributes related to the testing and engineering headcount/hours spent during end-to-end testing of previous test projects. The first data and the second data may be used to train the ML models 112a, 112b, respectively, in the test prediction service 102 to generate overall needed resources and associated overall or total costs for future testing projects. For example, the soft costs may include an amount of engineering, e.g., human effort, and associated hours used during a test project (which may include developing and designing the test project), and associated cost amounts for a new program, service, feature and/or other type of commerce platform entity within the service provider network 100 that is tested during a test project within the service provider network 100.

If the user only needs a rough prediction for a resource bill amount without needing to run extremely complicated test cases, the user may simply request such a rough prediction. Such a rough prediction may include a basic estimate of an overall cost for simple testing, e.g., without end-to-end testing, for a new program, service, feature and/or other type of commerce platform entity within the service provider network 100.

For the first ML model 112a, which may be trained and validated using a first data type from the first data store 110a and the first data source 104a, a user may input feature data to the first ML model 112a to obtain an estimated amount of services, resources, infrastructure, etc., e.g., computing resources, storage resources, etc., provided by the service provider network and an associated cost amount before actually running a test of a new program, service, etc. within the service provider network 100.

For the second ML model 112b, the user may input feature data to the second ML model 112b, which may be trained and validated using a second data type from the second data store 110b and the second data source 104b, to estimate an amount of engineering, e.g., human effort, needed to launch a new program, service, etc., e.g., a seller of record (SoR)

based on the SoR's attributes before actually running a test. The second ML model 112b may help program managers better prepare and estimate their launch schedules by providing an initial estimate of human hours needed for executing the test. The estimation may also include human hours needed to develop and/or select a test.

Both ML models may be continuously trained as more data is generated during testing procedures and provided to the two data stores. In configurations, other data stores and/or sources may be utilized to provide input data for the two ML models and/or for training the two ML models.

In particular, the first data from the first data store 110a may be utilized to train and validate the first ML model 112a and the first ML model 112a may be utilized to predict a test cost for a particular user (e.g., needed services, resources, infrastructure, etc., provided by the service provider network 100 and associated cost amount) for a new program, service, feature and/or other type of commerce platform entity within the service provider network 100. Generally, the first data store 112a may include many years of data related to thousands of tests that have been executed within the service provider network. Many test cases already cover a wide variety of use cases for testing new programs, services, features, etc. within the service provider network. Thus, the data from the first data store 110a may be exported and features may be extracted using the first ML model 112a in order to predict bill amounts that may be generated by future tests. The first ML model 112a may be trained, validated and deployed on a testing platform of the service provider network 100 in order to make the future predictions.

In configurations, the second data from the second data store 110b may be utilized to train and validate the second ML model 112b and the second ML model 110 may be utilized to predict a needed amount of resources and associated costs of launch for a new program, service, feature and/or other type of commerce platform entity within the service provider network 100. For example, for the second ML model 112b, tracking and recording of data may begin based on testing a specific seller of record (SoR), or other commerce platform entities, to calculate an expected amount work for testing a launch for a commerce platform entity. The testing data may be leveraged from the second data store 110b to estimate an amount of engineering hours, e.g., a number of engineers (humans and associated hours) required to configure commerce platform services for a launch of a new program, service, feature, or other commerce platform entity. This second data may be taken, processed and then fed into the second ML model 112b to calculate a needed amount of resources and a cost of launch for a certain type of commerce platform entity. When a user, such as, for example, a program manager or a quality assurance engineer, wishes to estimate an amount of work needed to launch a SoR, the user may input the SoR attributes to the second ML model 112b and receive an estimate from the second ML model 112b for testing the SoR prior to launch of the SoR.

In configurations, a known ML model such as, for example, Autogluon, may be leveraged to automatically create a tabular regression model as the first ML model 112a to predict a bill amount (e.g., needed services, resources, infrastructure, etc., provided by the service provider network and associated cost amount). The first ML model 112a may be created using the first data, e.g., test data from previous end-to-end test cases within the service provider network 100, from the first data store 110a. Autogluon-tabular may automatically create a complex ensemble learning model for the user to use without needing any human input. This Autogluon-tabular model may be trained with the test data from the first data store 110a from the past tests provided by the first data source 104a in order to predict future resource needs and associated costs. In configurations, data from other sources 104c may be used in addition to, or instead of, test data from the first data store 110a.

In configurations, the first data may be preprocessed and converted into CSV format by the management API 108, with or without input from the UI 106, to be input into the Autogluon model, e.g., the first ML model 112a. Each time another test case successfully creates a bill using the first ML model 112a, the Autogluon-tabular model may be further trained with the new data. Additionally, users may be asked to submit feedback based on whether the Autogluon-tabular model correctly predicted the bill amounts for their executed test cases. Thus, the first ML model's, e.g., the Autogluon-tabular model's, performance may be continuously improved. With enough data points from training the first ML model 112a with the first data from the first data store 110a (and after validating the first ML model 112a with the first data from the first data store 110a), the Autogluon-tabular model may be able to predict needed resources and associated costs in very complicated use cases (e.g., test cases) that are difficult to run through the first ML model 112a.

Preprocessing the first data, e.g., eliminating or adding data based on various thresholds such as, for example, upper bounds or lower bounds (e.g., eliminating outlier points) are important to training ML models. Such preprocessing may be performed by the management API 108, with or without input from the user via the UI 106, and may be performed prior to or after storing the first data in the first data store 110a. For example, there may be complex test cases that fail execution halfway and thus, for such test cases there is no bill amount even though a successful instance may have resulted in a bill. Thus, such data points need to be omitted or edited with correct data when training the first ML model 112a. Predicting a bill amount related to resources of the service provider network 100 used during the execution of a test may be a common use for such data. Complicated tests may often fail or take extremely long periods of time before finishing the testing process. Thus, the first model 112a may be trained and validated using all the successful test case data collected from past test cases and may provide a quick prediction of a bill amount for resources used by a future test case that a user desires to execute.

In configurations, the data format for input into the first ML model 112a may be such that features may include project name, test JSON string, test step count (e.g., a number of steps in a test), a bill run step in JSON (e.g., a bill was generated: yes or no, true or false), a customer name, and a bill amount. A label may include an infrastructure cost, e.g., an amount of the infrastructure (e.g., network service provider network resources, services, etc.) that is used, where the cost for use of such infrastructure may be attributed to the use of such infrastructure. Additionally, Autogluon may be utilized to pick the most accurate algorithm from, for example, linear regression, logistic regression, K-nearest neighbors, support vector machines, naïve bayes, decision tree, random forest, or K-means clustering. Table 1 provides an example of a data format for inputting data into the first ML model 112a.

TABLE 1

| project name | test step count | has bill run step | user name | description | test json string | bill amount | Service Provider infrastructure cost |
|---|---|---|---|---|---|---|---|
| C4860 - Anniversary with Refund | 23 | 1 | hom | Created with Test Creation Wizard | {"testSteps": ["action": "add EC2"]} | 605 | 919175 |
| InCa Czech Unified Invoice - Subscription With Refund | 18 | 0 | lihung | InCa Czech Unified invoice - subscription with Refund | {"testSteps": ["action": "remove EC2"]} | −605 | 203 |

As may be seen in table 1, a project name for a test project is included. A test step count (e.g., a number of steps in a test) is also included along with a bill run step (e.g., a bill was generated: yes or no, true or false). A description of the test project may also be included. A user name and a bill amount related to the test project is also included. An infrastructure cost, e.g., an amount of the infrastructure (e.g., network service provider network resources, services, etc.) that is used, where the cost for use of such infrastructure may be attributed to the use. Also, example test JSON strings for use during a test project may be included.

The first ML model 112*a*, e.g., the Autogluon model, may be created through an Autogluon console or through another ML model creation console or service. Because the creation of the first ML model 112*a* is abstracted away, some simple settings about the first ML model 112*a* may need to be adjusted:

Init Args: Only need is to specify the Label value in the CSV, can also add other parameters according to documentation init_args={"label": "bill amount" }

Fit Args: A list of presets on how to build the model in Autogluon fit_args={

Adding 'best_quality' to presets list will result in better performance (but longer runtime)

"presets": ["optimize_for_deployment", "best_quality" ],

}

Feature Importance: Boolean for whether Autogluon should weigh all features equally or try to distinguish important features "feature_importance": True Once the first ML model 112*a* is trained, a user may use the UI 106 to input information and features related to a test case for a new program, new service, or other commerce platform being provided by the service provider network 100 via the user interface 106 into the first ML model 112*a*. The first ML model 112*a* may evaluate the information and features and create an endpoint. The estimation API 114 may consume the endpoint to provide an estimation or prediction of "soft costs," e.g., the needed resources of the service provider network, needed infrastructure, latency caused by testing, etc., and provide a prediction for needed resources and infrastructure, along with associated costs. More particularly, the estimation and prediction may provide an estimated amount of services, resources, infrastructure, etc., e.g., computing resources, storage resources, etc., provided by the service provider network and an associated cost amount before actually running a test of a new program, service, etc. within the service provider network 100. The estimation and prediction may be provided to the dashboard 116 for reviewing by the user. The user may also be notified of the results via other visual and/or audible techniques.

Figure 2:
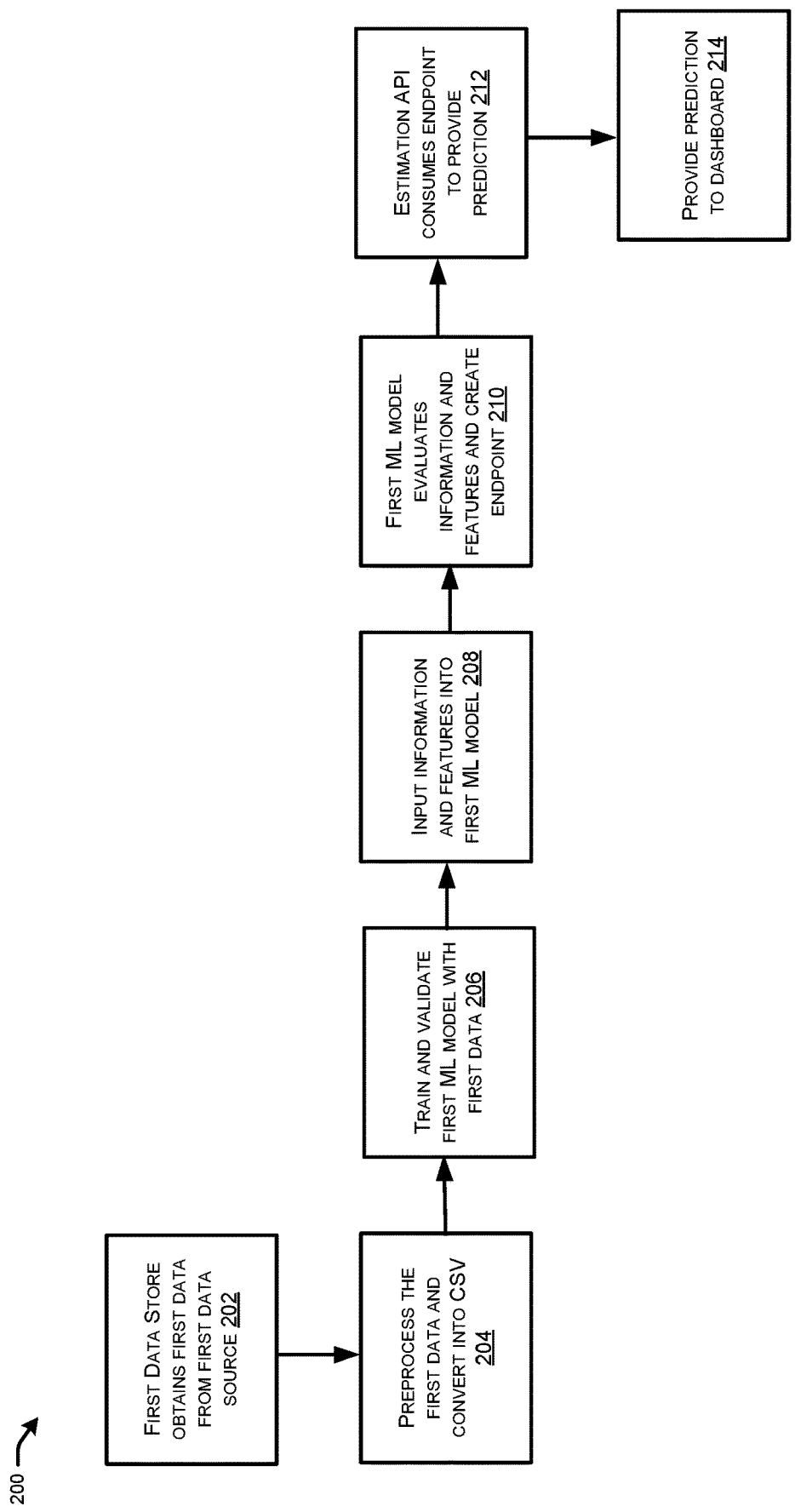
FIG. 2 schematically illustrates an example workflow for training and using a first ML model in the test prediction service of FIG. 1.

FIG. 2 schematically illustrates an example workflow 200 for training and using the first ML model 112*a*. At 202, the first data store 110*a* may obtain first data from the first data source 104*a*. At 204, the management API 108 may preprocess the data, e.g., eliminate, add, and/or correct first data for use in training the first ML model 112*a* and convert the first data into comma separated values (CSV) format. At 206, the first data from the first data store 110*a* may be used to train and validate the first ML model 112*a*. At 208, a user may then input information and features related to a test case for a new program, new service, or other commerce platform being provided by the service provider network 100 via the user interface 106 into the first ML model 112*a*. At 210, the first ML model 112*a* may evaluate the information and features and create an endpoint. At 212, the estimation API 114 may consume the endpoint, e.g., the API uses the output from the first ML model, to provide an estimation or prediction of "soft costs," e.g., the needed resources of the service provider network 100, needed infrastructure of the service provider network 100, latency caused by testing, etc., and provide a prediction for needed resources and infrastructure, along with associated costs. At 214, the prediction may be provided to the dashboard 116 for reviewing by the user. The user may also be notified of the results via other visual and/or audible techniques. In configurations, the first ML model 112*a* may produce the actual prediction or estimation of needed resources, infrastructure, etc. and associated costs as opposed to providing the endpoint that is consumed by the estimation API 114.

Referring to back to FIG. 1, in configurations, a known ML model such as, for example, Autogluon, may be leveraged to automatically create a tabular regression model as the second ML model 112*b* to predict a bill amount (e.g., engineering headcount/hours spent developing the end-to-end testing and/or during the end-to-end testing). The second ML model 112*b* may be created using the second data, e.g., test data from previous end-to-end test cases within the service provider network 100, from the second data store 110*b*. Autogluon-tabular may automatically create a complex ensemble learning model for the user to use without needing any human input. This Autogluon-tabular model may be trained with the test data from the second data store 110*b* from the past tests provided by the second data source 104*b* in order to predict future resource needs and associated costs, e.g., an amount of engineering hours, e.g., a number of engineers (humans and associated hours). In configurations, data from other sources 104*c* may be used in addition to, or instead of, test data from the second data store 110*b*.

The second data store 110*b* and data source 104*b* may be utilized by quality assurance engineers to help test the launch of SoRs within the service provider network 100.

This process involves inputting test cases into tests suites, with each test suite being a one-to-one mapping with a commerce platform entity. Many test cases may be automatically added to a test suite by the second data source 104b (e.g., a testing service within the service provider network 100) depending on the attributes of a commerce platform entity. Other test cases may be added manually by a party. Then a quality assurance engineer may submit a test suite run, which triggers a run for all the test cases in a test suite. Each run's final status, duration, number of failures, and number of successes may be recorded, also by leveraging the first data source 104 (e.g., another testing service within the service provider network 100), a list of issues and corresponding fix-it tickets may be created and provided to various service teams recorded by the execution of the test suite.

The second data, e.g., test data from previous end-to-end test cases within the service provider network 100, thus provides a rough estimate of how much engineering effort was used to launch a specific commerce platform. The number of test suite runs performed by humans, e.g., engineers such as quality assurance engineers, the number of test cases needed to validate a commerce platform, the number of engineering hours spent by service teams on issues opened by such testing, and the number of hours quality assurance engineers indicated they spent on a certain commerce platform may be used to calculate the total amount of engineering hours it takes to launch a commerce platform. As the second data source 104b grows, more data may be acquired and the data collecting process may be refined to target a more precise calculation. The feedback from users and actual launch data may be used to continuously improve the second ML model 112b over time.

In configurations, the test data may be preprocessed and converted into CSV format by the management API 108, with or without input from the UI 106, to be input into the Autogluon model, e.g., the second ML model 112b. Each time another test case successfully creates a bill using the second ML model 112b, the Autogluon-tabular model may be further trained with the new data. Additionally, users may be asked to submit feedback based on whether the Autogluon-tabular model correctly predicted the bill amounts for their executed test cases. Thus, the second ML model's, e.g., the Autogluon-tabular model's, performance may be continuously improved. With enough data points from training the second ML model 112b with the second data from the second data store 110b (and after validating the second ML model 112b with the second data from the second data store 110b), the Autogluon-tabular model may be able to predict needed resources and associated costs in very complicated use cases (e.g., test cases) that are difficult to run through the second ML model 112b.

Preprocessing of the second data may be performed by the management API 108, with or without input from the user via the UI 106, and may be performed prior to or after storing the first data in the first data store 110a. For example, there may be complex test cases that fail execution halfway and thus, for such test cases there is no bill amount even though a successful instance may have resulted in a bill. Thus, such data points need to be omitted or edited with correct data when training the second ML model 112b. Predicting a bill amount related to resources of the service provider network 100 used during the execution of a test may be a common use for such data. Complicated tests may often fail or take extremely long periods of time before finishing the testing process. Thus, second model 112b may be trained and validated using all the successful test case data collected from past test cases and may provide a quick prediction of a bill amount for resources used by a future test case that a user desires to execute.

In configurations, the data format for input into the second ML model 112b may be such that features may include project name, test JSON string, test step count (e.g., a number of steps in a test), a bill run step in JSON (e.g., a bill was generated: yes or no, true or false), a customer name, and a bill amount. A label may include an infrastructure cost, e.g., an amount of the infrastructure (e.g., network service provider network resources, services, etc.) that is used, where the cost for use of such infrastructure may be attributed to the use. Additionally, Autogluon may be utilized to pick the most accurate algorithm from, for example, linear regression, logistic regression, K-nearest neighbors, support vector machines, naïve bayes, decision tree, random forest, or K-means clustering. Table 1 above provides an example of a data format for inputting data into the second ML model 112b.

Additionally, as previously noted, the second ML model 112b, e.g., the Autogluon model, may be created through an Autogluon console or through another ML model creation console or service. Because the creation of the second ML model 112b is abstracted away, some simple settings about the second ML model 112b may need to be adjusted:

Init Args: Only need is to specify the Label value in the CSV, can also add other parameters according to documentation init_args={"label": "bill amount" }

Fit Args: A list of presets on how to build the model in Autogluon fit_args={
  #Adding 'best_quality' to presets list will result in better performance (but longer runtime)
  "presets": ["optimize_for_deployment", "best_quality" ],
}

Feature Importance: Boolean for whether Autogluon should weigh all features equally or try to distinguish important features "feature_importance": True Once the second ML model 112b is trained, a user may use the UI 106 to input information and features related to a test case for a new program, new service, or other commerce platform being provided by the service provider network 100 via the user interface 106 into the first ML model 112a. The second ML model 112b may evaluate the information and features and create an endpoint. The estimation API 114 may consume the endpoint to provide an estimation or prediction of "hard costs," e.g., an amount of needed engineering, e.g., human effort, needed to launch a new program, service, etc., e.g., a seller of record (SoR) and based on the SoR's attributes, before actually running a test. More particularly, the estimation and prediction may provide an estimated amount of needed engineering, e.g., human effort, needed to launch a new program, service, etc., e.g., a seller of record (SoR) and based on the SoR's attributes, and an associated cost amount before actually running a test of a new program, service, etc. within the service provider network 100. The estimation and prediction may be provided to the dashboard 116 for reviewing by the user. The user may also be notified of the results via other visual and/or audible techniques.

Figure 3:
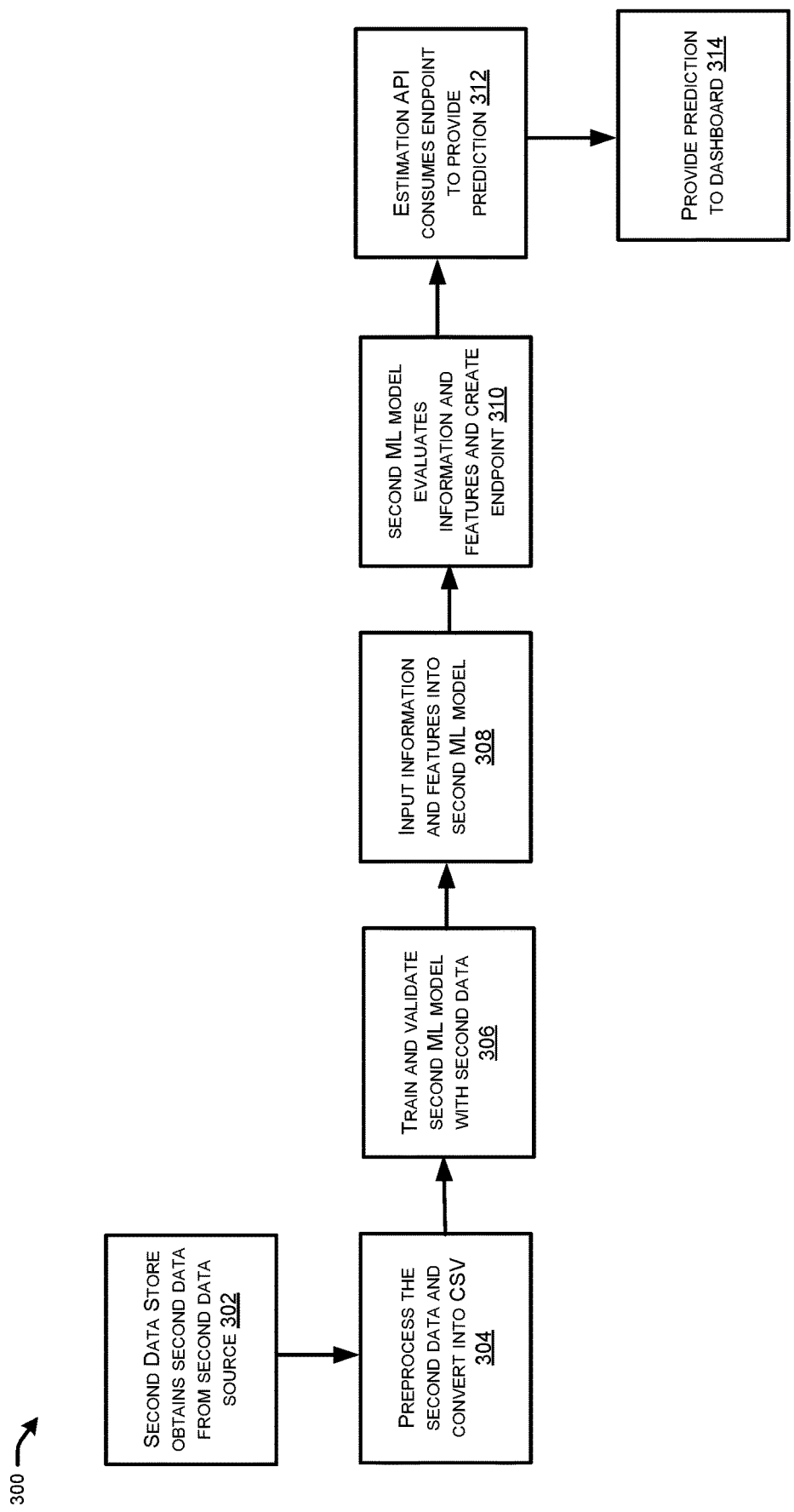
FIG. 3 schematically illustrates an example workflow for training and using a second ML model in the test prediction service of FIG. 1.

FIG. 3 schematically illustrates an example workflow 300 for training and using the second ML model 112b. In configurations, at 302 the second data store 110b may obtain second data from the second data source 104b. At 304, the management API 108 may preprocess the data, e.g., eliminate, add, and/or correct second data for use in training the second ML model 112b and convert the second data into comma separated values (CSV) format. At 306, the second data from the second data store 110b may be used to train and validate the second ML model 112b. At 308, a user may then input information and features related to a test case for a new program, new service, or other commerce platform being provided by the service provider network 100 via the user interface 106 into the second ML model 112b. At 310, the second ML model 112b may evaluate the information and features and create an endpoint. At 312, the estimation API 114 may consume the endpoint to provide an estimation or prediction of "hard costs," e.g., an amount of needed engineering, e.g., human effort, and provide a prediction for needed resources, e.g., needed headcount and associated hours, along with associated costs. At 314, the prediction may be provided to the dashboard 116 for reviewing by the user. The user may also be notified of the results via other visual and/or audible techniques. In configurations, the second ML model 112b may produce the actual prediction or estimation of needed headcount and associated hours, along with associated costs as opposed to providing the endpoint that is consumed by the estimator API 114.

In configurations, the results of the two ML models 112a, 112b may be combined by the estimation API 114 to provide a total estimated cost for a test project. The dashboard 116 may display the individual results of the two ML models 112a, 112b, as well as a combined total of the results of the two ML models 112a, 112b. In configurations, the dashboard 116 may combine the results of the two ML models 112a, 112b. Additionally, in configurations, the dashboard 116 may provide a cost history at a test project, account and artifact level. The user may thus see the cost trending of the test project. The data sources 104a, 104b, and 104c may be the data source for the dashboard 116.

In configurations, the replicator 118 may replicate results of one or both of the ML models 112a, 112b from the estimation API across multiple segments of the service provider network 100. In configurations, the multiple segments may represent different geographical regions.

Figure 4:
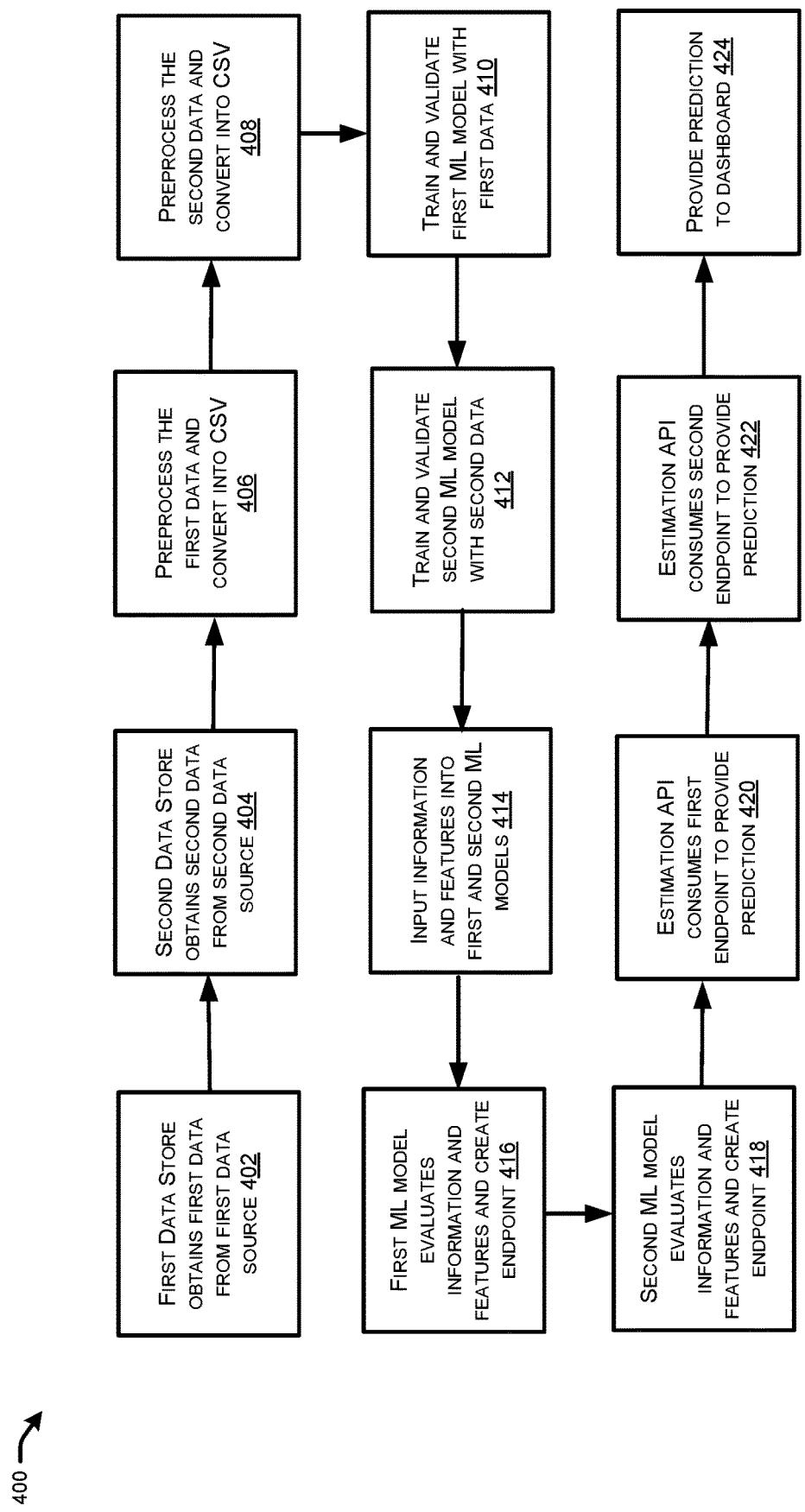
FIG. 4 schematically illustrates an example workflow for training and using the first ML model and the second ML model in the test prediction service of FIG. 1.

FIG. 4 schematically illustrates an example workflow 400 for predicting and estimating needed resources and estimating associated costs associated with testing of new programs, services, features, etc. and associated commerce platform entities within the service provider network 100.

At 402, the first data source 104a may provide first data to the first data store 110a. In configurations, the first data source 104a is a first testing service within the service provider network 100.

At 404, the second data source 104b may provide second data to the second data store 110b. In configurations, the second data source 104b is a second testing service within the service provider network 100. In configurations, steps 402 and 404 may occur simultaneously.

At 406, the management API 108 may preprocess the first data, e.g., eliminate, add, and/or correct first data for use in training the first ML model 112a and convert the first data into comma separated values (CSV) format. In configurations, step 406 may be performed prior to step 402.

At 408, the management API 108 may preprocess the second data, e.g., eliminate, add, and/or correct first data for use in training the second ML model 112b and convert the second data into comma separated values (CSV) format. In configurations, step 408 may be performed prior to step 404. In configurations, steps 406 and 408 may occur simultaneously.

At 410, the first data from the first data store 110a may be used to train and validate the first ML model 112a. At 412, the second data from the second data store 110b may be used to train and validate the second ML model 112b. In configurations, steps 412 and 410 may occur simultaneously.

At 414, a user may then input information and features related to a test case for a new program, new service, or other commerce platform being provided by the service provider network 100 via the user interface 106 into the first ML model 112a and the second ML model 112b.

At 416, the first ML model 112a may evaluate the information and features and create a first endpoint. At 418, the second ML model 112b may evaluate the information and features and create a second endpoint. In configurations, steps 414 and 416 may occur simultaneously.

At 420, the estimation API 114 may consume the first endpoint to provide an estimation or prediction of "hard costs," e.g., the needed resources of the service provider network 100, needed infrastructure of the service provider network 100, latency caused by testing, etc., and provide a prediction for needed resources and infrastructure, along with associated costs.

At 422, the estimation API 114 may consume the second endpoint to provide an estimation or prediction of "soft costs," e.g., the needed headcount and associated hours, along with associated costs, and provide a prediction for needed resources, e.g., needed headcount and associated hours, along with associated costs.

At 424, the predictions may be provided to the dashboard 116 for reviewing by the user. The predictions from steps 418 and 420 may be combined into a total cost estimate. The user may also be notified of the results via other visual and/or audible techniques. In configurations, the first ML model 112a may produce the actual prediction or estimation of needed resources, infrastructure, etc. and associated costs as opposed to providing the endpoint that is consumed by the estimator API 114.

FIG. 5 illustrates a flow diagram of an example method 500 that illustrates aspects of the functions performed at least partly by the services as described in FIGS. 1-4. The logical operations described herein with respect to FIG. 5 may be implemented (1) as a sequence of computer-implemented acts or program modules running on a computing system, and/or (2) as interconnected machine logic circuits or circuit modules within the computing system.

The implementation of the various components described herein is a matter of choice dependent on the performance and other requirements of the computing system. Accordingly, the logical operations described herein are referred to variously as operations, structural devices, acts, or modules. These operations, structural devices, acts, and modules can be implemented in software, in firmware, in special purpose digital logic, and any combination thereof. It should also be appreciated that more or fewer operations might be performed than shown in FIG. 5 and described herein. These operations can also be performed in parallel, or in a different order than those described herein. Some or all of these operations can also be performed by components other than those specifically identified. Although the techniques described in this disclosure are with reference to specific components, in other examples, the techniques may be implemented by less components, more components, different components, or any configuration of components.

FIG. 5 illustrates a flow diagram of the example method 500 for automatically predicting and estimating needed resources and estimating associated costs associated with testing of new programs, services, features, etc. and associated commerce platform entities within an on-demand computing platform, e.g., service provider network 100.

At 502, a test prediction service within a service provider network receives information related to end-to-end testing of a new commerce platform within the service provider network prior to launching of the new commerce platform within the service provider network. For example, once the first ML model 112*a* and/or the second ML model 112*b* are trained, a user may use the UI 106 to input information and features related to a test case for a new program, new service, or other commerce platform being provided by the service provider network 100 into the test prediction service 100 via the user interface 106 into the first ML model 112*a*.

At 504, the test prediction service determines needed first resources for the end-to-end testing of the new commerce platform prior to launching of the new commerce platform, wherein the test prediction service utilizes a first machine learning algorithm for the determining. For example, once the first ML model 112*a* has been trained and validated, the first ML model 112*a* may evaluate the information and features and determine an estimation of "soft costs," e.g., the needed resources of the service provider network, needed infrastructure, etc. More particularly, the estimation may provide an estimated amount of services, resources, infrastructure, etc., e.g., computing resources, storage resources, etc., provided by the service provider network. In configurations, the first ML model 112*a* may determine the estimation of "soft costs" or may create an endpoint that is consumed by the management API 114 to estimate the "soft costs."

At 506, the test prediction service determines needed second resources for the end-to-end testing of the new commerce platform prior to launching of the new commerce platform, wherein the test prediction service utilizes a second machine learning algorithm for the determining. For example, once the second ML model 112*b* has been trained and validated, the second ML model 112*a* may evaluate the information and features and determine an estimation of "hard costs," e.g., an amount of needed engineering, e.g., human effort, needed to launch anew program, service, etc. within the service provider network 100, e.g., a seller of record (SoR) and based on the SoR's attributes, before actually running a test within the service provider network 100. In configurations, the second ML model 112*b* may determine the estimation of "hard costs" or may create an endpoint that is consumed by the management API 114 to estimate the "hard costs."

At 508, based on (i) the information related to the new commerce platform within the service provider network and (ii) the first and second needed resources for testing of the new commerce platform prior to launching of the new commerce platform, the test prediction service predicts an estimated cost associated with (i) the needed first resources to perform the testing of the new commerce platform and (ii) the needed second resources to perform the testing of the new commerce platform. For example, the estimation API 114 may consume a first endpoint created by the first machine learning algorithm provide a prediction for needed resources and infrastructure, along with associated costs. The estimation API 114 may consume a second endpoint to provide an estimation or prediction of "soft costs," e.g., the needed resources of the service provider network 100, needed infrastructure of the service provider network 100, etc., and provide a prediction for needed resources, e.g., needed headcount and associated hours, along with associated costs. In configurations, the first and second ML models may perform the estimation and prediction of needed resources and associated costs directly. In configurations, the first and second ML models 112*a*, 112*b* may provide the predictions of "soft costs" and "hard costs," respectively.

Accordingly, the techniques and architecture described herein provide a test prediction service within a service provider network. The test prediction service provides application programming interfaces (APIs) for data import and a user interface (UI) for user access to view a dashboard on past and future testing resource requirements. A first ML model may be used for "hard costs" using data from a first data source or data store that includes end-to-end test details as a feature and associated resource and infrastructure use (costs) of the service provider network during the end-to-end testing. A second ML model may be used for "soft costs" using data from a second data source or data store that includes data entity attributes related to the testing, e.g., engineering headcount/hours spent developing the end-to-end testing and/or during the end-to-end testing. This data may be used to train the ML models in the test prediction service to generate overall needed resources and associated overall or total costs for future testing projects. The test prediction service may use the trained ML model(s) to generate the total testing costs of a new testing project when a user enters project attributes. The test prediction service processes these attributes and predicts the needed resources and/or associated costs of different test scenarios based on the trained machine learning models from the test prediction service.

Figure 6:
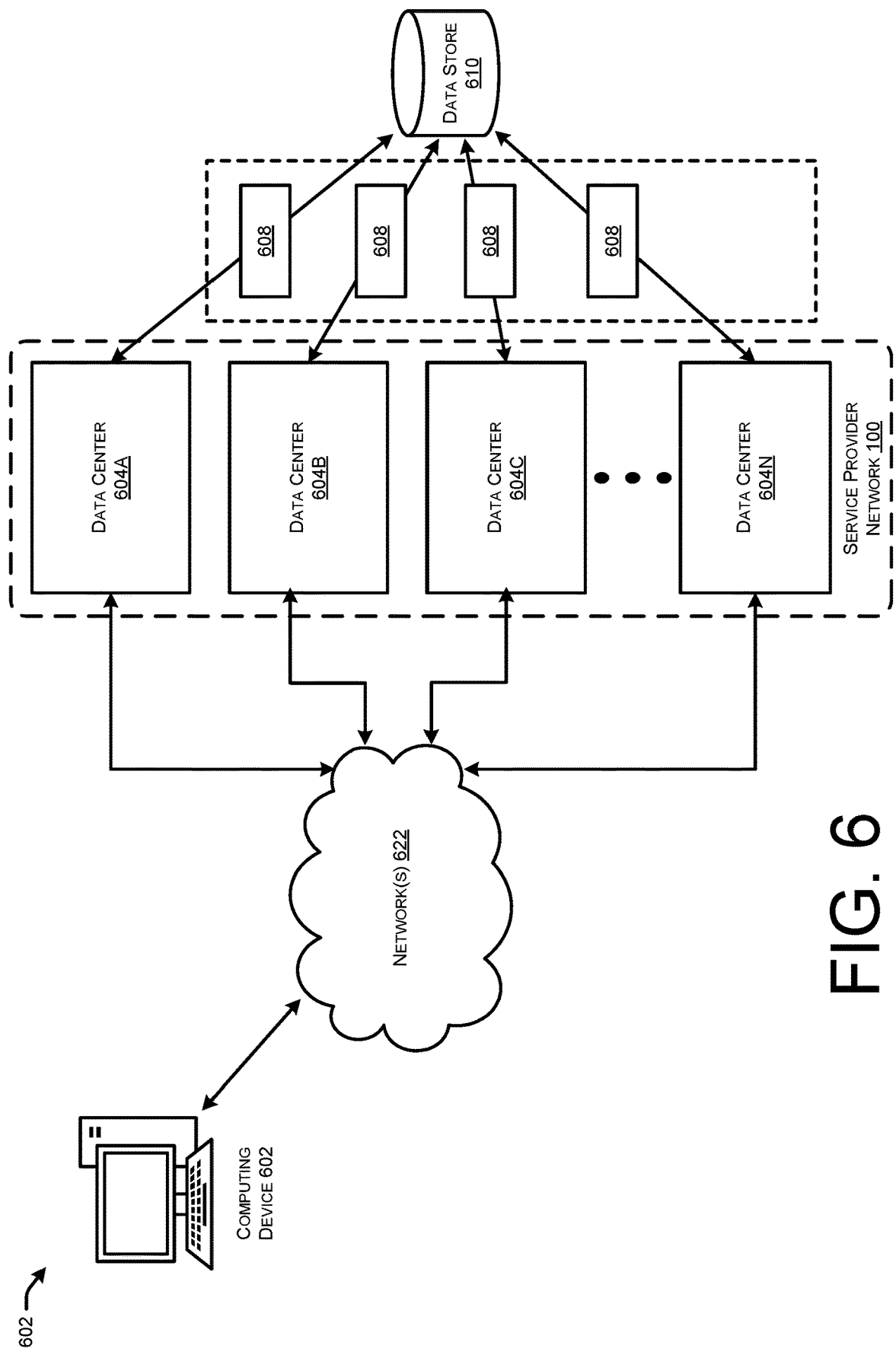
FIG. 6 is a system and network diagram that shows an illustrative operating environment that includes a service provider network that can be configured to implement aspects of the functionality described herein.

FIG. 6 is a system and network diagram that shows one illustrative operating environment 602 for the configurations disclosed herein that includes a service provider network 100 that can be configured to perform the techniques disclosed herein and which may be accessed by a computing device 602. The service provider network 100 can provide computing resources, like VM instances and storage, on a permanent or an as-needed basis. Among other types of functionality, the computing resources provided by the service provider network 100 may be utilized to implement the various services described above such as, for example, the test prediction service 102.

Each type of computing resource provided by the service provider network 100 can be general-purpose or can be available in a number of specific configurations. For example, data processing resources can be available as physical computers or VM instances in a number of different configurations. The VM instances can be configured to execute applications, including web servers, application servers, media servers, database servers, some or all of the network services described above, and/or other types of programs. Data storage resources can include file storage devices, block storage devices, and the like. The service provider network 100 can also be configured to provide other types of computing resources not mentioned specifically herein.

The computing resources provided by the service provider network 100 may be enabled in one embodiment by one or more data centers 604A-604N (which might be referred to herein singularly as "a data center 604" or in the plural as "the data centers 604"). The data centers 604 are facilities utilized to house and operate computer systems and associated components. The data centers 604 typically include redundant and backup power, communications, cooling, and security systems. The data centers 604 can also be located in geographically disparate locations. One illustrative embodiment for a data center 604 that can be utilized to implement the technologies disclosed herein will be described below with regard to FIG. 6.

The data centers 604 may be configured in different arrangements depending on the service provider network 100. For example, one or more data centers 604 may be included in or otherwise make-up an availability zone. Further, one or more availability zones may make-up or be included in a region. Thus, the service provider network 100 may comprise one or more availability zones, one or more regions, and so forth. The regions may be based on geographic areas, such as being located within a predetermined geographic perimeter.

Users of the service provider network 100 may access the computing resources provided by the service provider network 100 over any wired and/or wireless network(s) 622, which can be a wide area communication network ("WAN"), such as the Internet, an intranet or an Internet service provider ("ISP") network or a combination of such networks. For example, and without limitation, a computing device, e.g., computing device 602, operated by a user of the service provider network 100 may be utilized to access the service provider network 100 by way of the network(s) 622. It should be appreciated that a local-area network ("LAN"), the Internet, or any other networking topology known in the art that connects the data centers 604 to remote customers and other users can be utilized. It should also be appreciated that combinations of such networks can also be utilized.

Each of the data centers 604 may include computing devices that include software, such as applications that receive and transmit data 608. For instance, the computing devices included in the data centers 604 may include software components which transmit, retrieve, receive, or otherwise provide or obtain the data 608 from a data store 610, e.g., data stores 110*a*, 110*b*. For example, the data centers 604 may include or store the data store 610, which may include the data 608.

Figure 7:
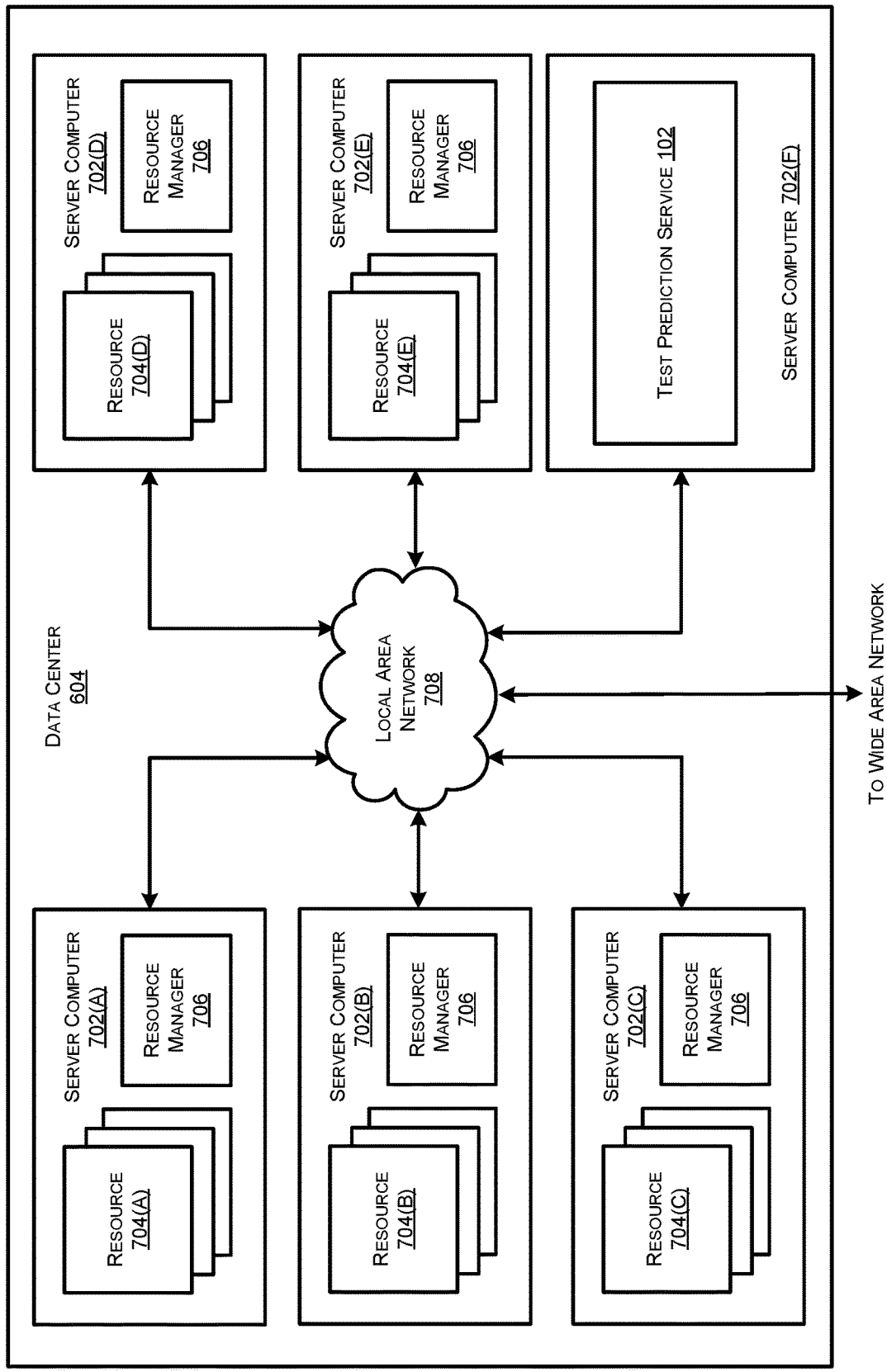
FIG. 7 is a computing system diagram illustrating a configuration for a data center that can be utilized to implement aspects of the technologies disclosed herein.

FIG. 7 is a computing system diagram that illustrates one configuration for a data center 704 that implements aspects of the technologies disclosed herein. The example data center 704 shown in FIG. 7 includes several server computers 702A-702F (which might be referred to herein singularly as "a server computer 702" or in the plural as "the server computers 702") for providing computing resources 704A-704E.

The server computers 702 can be standard tower, rack-mount, or blade server computers configured appropriately for providing the computing resources described herein (illustrated in FIG. 7 as the computing resources 704A-704E). As mentioned above, the computing resources provided by the service provider network 100 can be data processing resources such as VM instances or hardware computing systems, database clusters, computing clusters, storage clusters, data storage resources, database resources, networking resources, and others. Some of the servers 702 can also be configured to execute a resource manager 706 capable of instantiating and/or managing the computing resources. In the case of VM instances, for example, the resource manager 706 can be a hypervisor or another type of program configured to enable the execution of multiple VM instances on a single server computer 702. Server computers 702 in the data center 704 can also be configured to provide network services and other types of services, some of which are described in detail below with regard to FIG. 16.

The data center 704 shown in FIG. 7 also includes a server computer 702F that can execute some or all of the software components described above. For example, and without limitation, the server computer 702F can be configured to execute components of the service provider network 100, including the test prediction service 102, and/or the other software components described above. The server computer 702F can also be configured to execute other components and/or to store data for providing some or all of the functionality described herein. In this regard, it should be appreciated that the services illustrated in FIG. 7 as executing on the server computer 702F can execute on many other physical or virtual servers in the data centers 704 in various embodiments.

In the example data center 704 shown in FIG. 7, an appropriate LAN 708 is also utilized to interconnect the server computers 702A-702F. It should be appreciated that the configuration and network topology described herein has been greatly simplified and that many more computing systems, software components, networks, and networking devices can be utilized to interconnect the various computing systems disclosed herein and to provide the functionality described above. Appropriate load balancing devices or other types of network infrastructure components can also be utilized for balancing a load between each of the data centers 704A-704N, between each of the server computers 702A-702F in each data center 704, and, potentially, between computing resources in each of the server computers 702. It should be appreciated that the configuration of the data center 704 described with reference to FIG. 7 is merely illustrative and that other implementations can be utilized.

Figure 8:
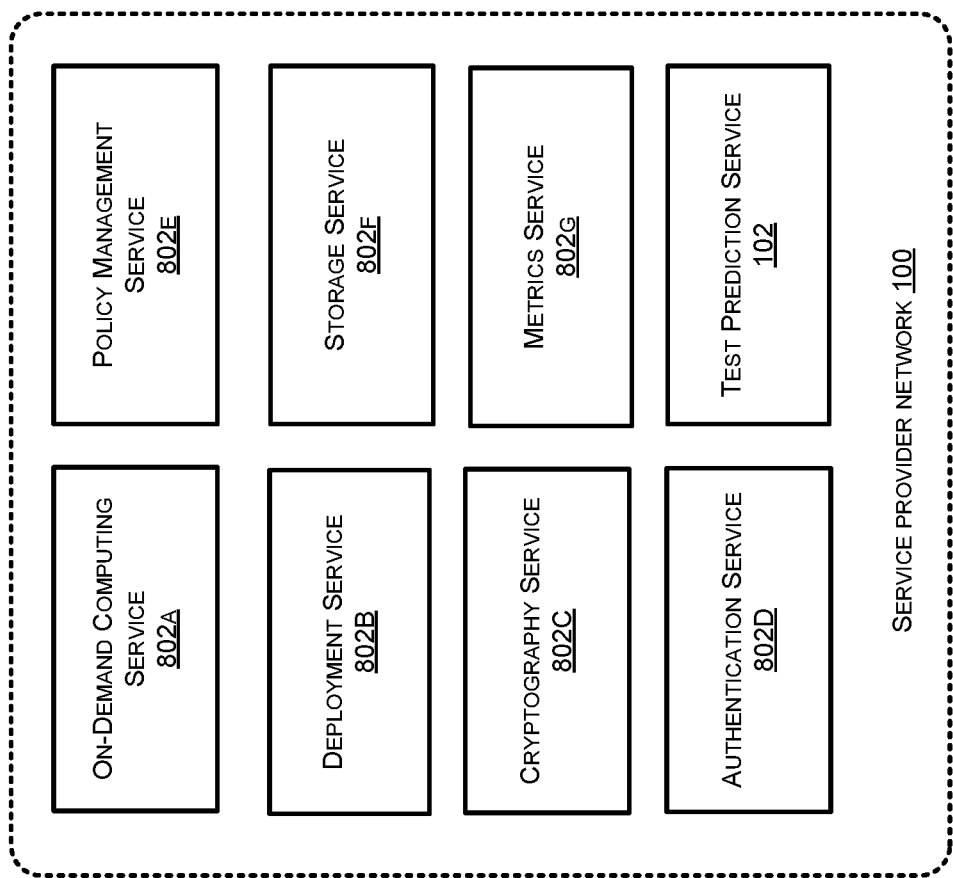
FIG. 8 is a network services diagram that shows aspects of several services that can be provided by and utilized within a system, or a larger system of which the system is a part, which is configured to implement the various technologies disclosed herein.

FIG. 8 is a system and network diagram that shows aspects of several network services that can be provided by and utilized within a service provider network 100 in one embodiment disclosed herein. In particular, and as discussed above, the service provider network 100 can provide a variety of network services to users within the service provider network 100, as well as customers, including, but not limited to, the test prediction service 102. The service provider network 100 can also provide other types of services including, but not limited to, an on-demand computing service 802A, a deployment service 802B, a cryptography service 802C, a storage service 802D, an authentication service 802E, and/or a policy management service 802G, some of which are described in greater detail below. Additionally, the service-provider network 100 can also provide other services, some of which are also described in greater detail below.

It should be appreciated that customers of the service provider network 100 can include organizations or individuals that utilize some or all of the services provided by the service provider network 100. As described herein, a customer or other user can communicate with the service provider network 100 through a network, such as the network 622 shown in FIG. 6. Communications from a user computing device, such as the computing device 602 shown in FIG. 6, to the service provider network 100 can cause the services provided by the service provider network 100 to operate in accordance with the described configurations or variations thereof.

It is noted that not all embodiments described include the services described with reference to FIG. 8 and that additional services can be provided in addition to or as an alternative to services explicitly described. Each of the services shown in FIG. 8 can also expose network services interfaces that enable a caller to submit appropriately configured API calls to the various services through web service requests. In addition, each of the services can include service interfaces that enable the services to access each other (e.g., to enable a virtual computer system provided by the on-demand computing service 802A to store data in or retrieve data from a storage service). Additional details regarding some of the services shown in FIG. 8 will now be provided.

As discussed above, the on-demand computing service 802A (can be a collection of computing resources configured to instantiate VM instances and to provide other types of computing resources on demand. For example, a customer or other user of the service provider network 100 can interact with the on-demand computing service 802A (via appropriately configured and authenticated network services API calls) to provision and operate VM instances that are instantiated on physical computing devices hosted and operated by the service provider network 100.

The VM instances can be used for various purposes, such as to operate as servers supporting a web site, to operate business applications or, generally, to serve as computing resources for the customer. Other applications for the VM instances can be to support database applications such as those described herein, electronic commerce applications, business applications and/or other applications. Although the on-demand computing service 802A is shown in FIG. 8, any other computer system or computer system service can be utilized in the service provider network 100, such as a computer system or computer system service that does not employ virtualization and instead provisions computing resources on dedicated or shared computers/servers and/or other physical devices.

The service provider network 100 can also include a cryptography service 802C. The cryptography service 802C can utilize storage services of the service provider network 100 to store encryption keys in encrypted form, whereby the keys are usable to decrypt customer keys accessible only to particular devices of the cryptography service 802C. The cryptography service 802C can also provide other types of functionality not specifically mentioned herein.

As illustrated in FIG. 8, the service provider network 100, in various embodiments, also includes an authentication service 802D and a policy management service 802E. The authentication service 802D, in one example, is a computer system (i.e., collection of computing resources) configured to perform operations involved in authentication of users. For instance, one of the services 802 shown in FIG. 8 can provide information from a user to the authentication service 802D to receive information in return that indicates whether or not the requests submitted by the user are authentic.

The policy management service 802E, in one example, is a network service configured to manage policies on behalf of customers or internal users of the service provider network 100. The policy management service 802E can include an interface that enables customers to submit requests related to the management of policy. Such requests can, for instance, be requests to add, delete, change or otherwise modify policy for a customer, service, or system, or for other administrative actions, such as providing an inventory of existing policies and the like.

The service provider network 100 can additionally maintain other services 802 based, at least in part, on the needs of its customers. For instance, the service provider network 100 can maintain a deployment service 802B for deploying program code and/or a data warehouse service in some embodiments. Other services can include object-level archival data storage services, database services, and services that manage, monitor, interact with, or support other services. The service provider network 100 can also be configured with other services not specifically mentioned herein in other embodiments.

Figure 9:
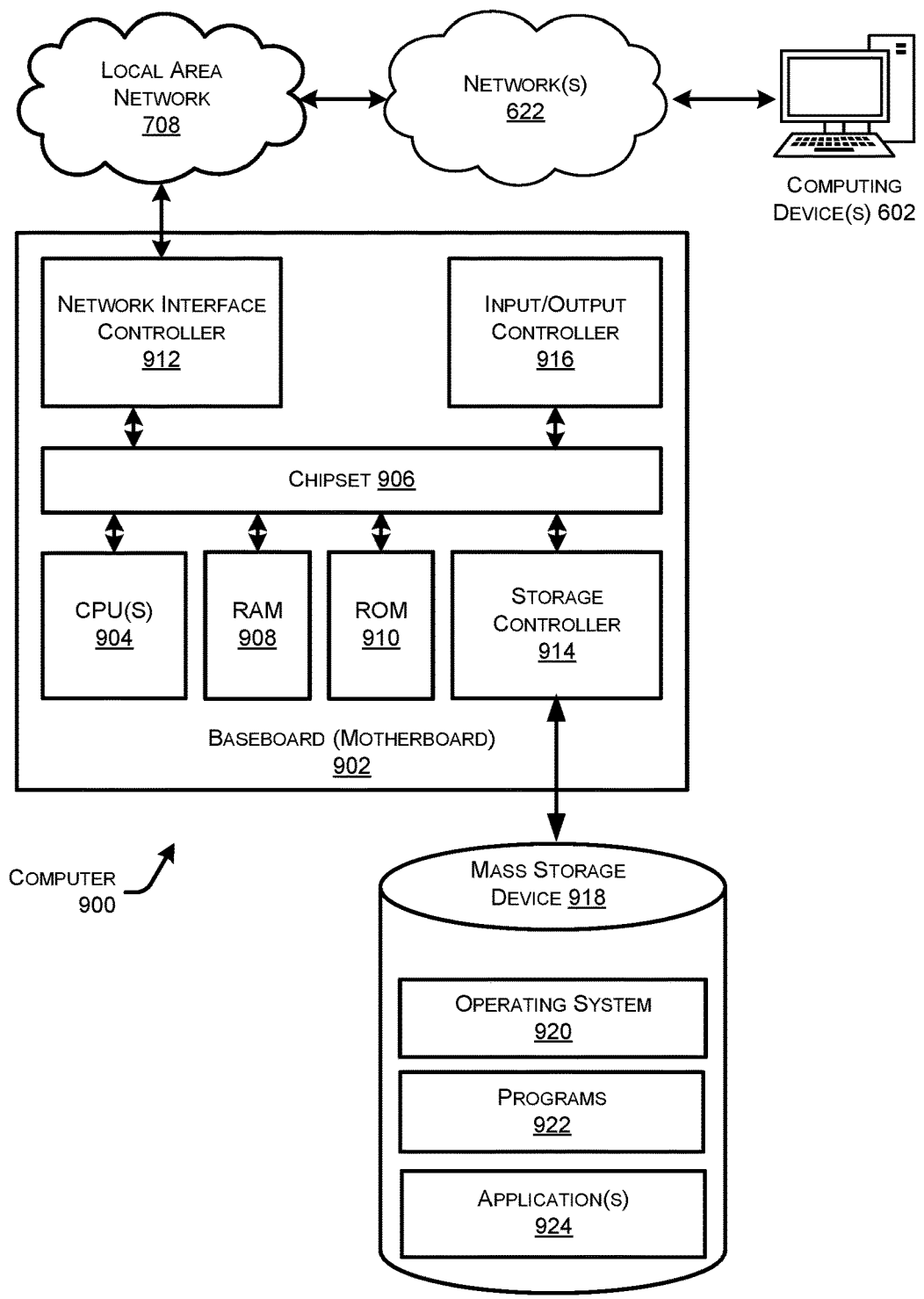
FIG. 9 is a computer architecture diagram showing an illustrative computer hardware architecture for implementing a computing device that can be utilized to implement aspects of the various technologies presented herein.

FIG. 9 shows an example computer architecture for a computer 900 capable of executing program components for implementing the functionality described above. The computer architecture shown in FIG. 9 illustrates a server computer, workstation, desktop computer, laptop, tablet, network appliance, e-reader, smartphone, or other computing device, and can be utilized to execute any of the software components presented herein.

The computer 900 includes a baseboard 902, or "motherboard," which is a printed circuit board to which a multitude of components or devices can be connected by way of a system bus or other electrical communication paths. In one illustrative configuration, one or more central processing units ("CPUs") 904 operate in conjunction with a chipset 906. The CPUs 904 can be standard programmable processors that perform arithmetic and logical operations necessary for the operation of the computer 900.

The CPUs 904 perform operations by transitioning from one discrete, physical state to the next through the manipulation of switching elements that differentiate between and change these states. Switching elements generally include electronic circuits that maintain one of two binary states, such as flip-flops, and electronic circuits that provide an output state based on the logical combination of the states of one or more other switching elements, such as logic gates. These basic switching elements can be combined to create more complex logic circuits, including registers, adders-subtractors, arithmetic logic units, floating-point units, and the like.

The chipset 906 provides an interface between the CPUs 904 and the remainder of the components and devices on the baseboard 902. The chipset 906 can provide an interface to a RAM 908, used as the main memory in the computer 900. The chipset 906 can further provide an interface to a computer-readable storage medium such as a read-only memory ("ROM") 910 or non-volatile RAM ("NVRAM") for storing basic routines that help to startup the computer 900 and to transfer information between the various components and devices. The ROM 910 or NVRAM can also store other software components necessary for the operation of the computer 900 in accordance with the configurations described herein.

The computer 900 can operate in a networked environment using logical connections to remote computing devices 602 and computer systems through a network, such as the network 608. The chipset 906 can include functionality for providing network connectivity through a Network Interface Controller (NIC) 912, such as a gigabit Ethernet adapter. The NIC 912 is capable of connecting the computer 900 to other computing devices 602 over the network 708 (or 622). It should be appreciated that multiple NICs 912 can be present in the computer 900, connecting the computer to other types of networks and remote computer systems.

The computer 900 can be connected to a mass storage device 918 that provides non-volatile storage for the computer. The mass storage device 918 can store an operating system 920, programs 922 (e.g., agents, etc.), data, and/or applications(s) 924, which have been described in greater detail herein. The mass storage device 918 can be connected to the computer 900 through a storage controller 914 connected to the chipset 906. The mass storage device 918 can consist of one or more physical storage units. The storage controller 914 can interface with the physical storage units through a serial attached SCSI ("SAS") interface, a serial advanced technology attachment ("SATA") interface, a fiber channel ("FC") interface, or other type of interface for physically connecting and transferring data between computers and physical storage units.

The computer 900 can store data on the mass storage device 918 by transforming the physical state of the physical storage units to reflect the information being stored. The specific transformation of physical states can depend on various factors, in different embodiments of this description. Examples of such factors can include, but are not limited to, the technology used to implement the physical storage units, whether the mass storage device 918 is characterized as primary or secondary storage, and the like.

For example, the computer 900 can store information to the mass storage device 918 by issuing instructions through the storage controller 914 to alter the magnetic characteristics of a particular location within a magnetic disk drive unit, the reflective or refractive characteristics of a particular location in an optical storage unit, or the electrical characteristics of a particular capacitor, transistor, or other discrete component in a solid-state storage unit. Other transformations of physical media are possible without departing from the scope and spirit of the present description, with the foregoing examples provided only to facilitate this description. The computer 900 can further read information from the mass storage device 918 by detecting the physical states or characteristics of one or more particular locations within the physical storage units.

In addition to the mass storage device 918 described above, the computer 900 can have access to other computer-readable storage media to store and retrieve information, such as program modules, data structures, or other data. It should be appreciated by those skilled in the art that computer-readable storage media is any available media that provides for the non-transitory storage of data and that can be accessed by the computer 900. In some examples, the operations performed by the service provider network 100, and or any components included therein, may be supported by one or more devices similar to computer 900. Stated otherwise, some or all of the operations performed by the service provider network 100, and or any components included therein, may be performed by one or more computer devices 900 operating in a cloud-based arrangement.

By way of example, and not limitation, computer-readable storage media can include volatile and non-volatile, removable and non-removable media implemented in any method or technology. Computer-readable storage media includes, but is not limited to, RAM, ROM, erasable programmable ROM ("EPROM"), electrically-erasable programmable ROM ("EEPROM"), flash memory or other solid-state memory technology, compact disc ROM ("CD-ROM"), digital versatile disk ("DVD"), high definition DVD ("HD-DVD"), BLU-RAY, or other optical storage, magnetic cassettes, magnetic tape, magnetic disk storage or other magnetic storage devices, or any other medium that can be used to store the desired information in a non-transitory fashion.

As mentioned briefly above, the mass storage device 918 can store an operating system 920 utilized to control the operation of the computer 900. According to one embodiment, the operating system comprises the LINUX operating system. According to another embodiment, the operating system comprises the WINDOWS® SERVER operating system from MICROSOFT Corporation of Redmond, Washington. According to further embodiments, the operating system can comprise the UNIX operating system or one of its variants. It should be appreciated that other operating systems can also be utilized. The mass storage device 918 can store other system or application programs and data utilized by the computer 900.

In one embodiment, the mass storage device 918 or other computer-readable storage media is encoded with computer-executable instructions which, when loaded into the computer 900, transform the computer from a general-purpose computing system into a special-purpose computer capable of implementing the embodiments described herein. These computer-executable instructions transform the computer 900 by specifying how the CPUs 904 transition between states, as described above. According to one embodiment, the computer 900 has access to computer-readable storage media storing computer-executable instructions which, when executed by the computer 900, perform the various processes described above with regard to FIGS. 1-9. The computer 900 can also include computer-readable storage media having instructions stored thereupon for performing any of the other computer-implemented operations described herein.

The computer 900 can also include one or more input/output controllers 916 for receiving and processing input from a number of input devices, such as a keyboard, a mouse, a touchpad, a touch screen, an electronic stylus, or other type of input device. Similarly, an input/output controller 916 can provide output to a display, such as a computer monitor, a flat-panel display, a digital projector, a printer, or other type of output device. It will be appreciated that the computer 900 might not include all of the components shown in FIG. 9, can include other components that are not explicitly shown in FIG. 9, or might utilize an architecture completely different than that shown in FIG. 9.

The computer 900 may transmit, receive, retrieve, or otherwise provide and/or obtain data and/or results to and/or from the service provider network 100. The computer 900 may store the data on the operating system 920, and/or the programs 922 that are stored in the mass storage device 918 to update or otherwise modify the operating system 920 and/or the programs 922.

While the foregoing invention is described with respect to the specific examples, it is to be understood that the scope of the invention is not limited to these specific examples. Since other modifications and changes varied to fit particular operating requirements and environments will be apparent to those skilled in the art, the invention is not considered limited to the example chosen for purposes of disclosure, and covers all changes and modifications which do not constitute departures from the true spirit and scope of this invention.

Although the application describes embodiments having specific structural features and/or methodological acts, it is to be understood that the claims are not necessarily limited to the specific features or acts described. Rather, the specific features and acts are merely illustrative of some embodiments that fall within the scope of the claims of the application.

What is claimed is:

1. A computer-implemented method comprising:
receiving, at a test prediction service within a service provider network, information related to end-to-end testing of a new commerce platform within the service provider network prior to launching of the new commerce platform within the service provider network;
determining, by the test prediction service and utilizing a first machine learning algorithm, needed first resources for the end-to-end testing of the new commerce platform prior to launching of the new commerce platform, wherein the needed first resources comprise services of the service provider network that are consumed during the end-to-end testing;
determining, by the test prediction service and using a second machine learning algorithm, needed second resources for the end-to-end testing of the new commerce platform prior to launching of the new commerce platform, wherein the needed second resources comprise a number of individuals and a corresponding amount of time of the number of individuals to be active in developing the testing of the new commerce platform and executing the testing of the new commerce platform; and based on (i) the information related to the new commerce platform within the service provider network and (ii) the first and second needed resources for testing of the new commerce platform prior to launching of the new commerce platform, predicting, by an estimation application programming interface (API) of the test prediction service, an estimated cost associated with (i) the needed first resources to perform the testing of the new commerce platform and (ii) the needed second resources to perform the testing of the new commerce platform, wherein a first set of data obtained from a first service of the service provider network is utilized for training the first machine learning algorithm utilized by the test prediction service for predicting the services of the service provider network to be consumed during the testing, wherein a second set of data obtained from a second service of the service provider network is utilized for training the second machine learning algorithm utilized by the test prediction service for predicting the number of individuals and the corresponding amount of time of the number of individuals to be active in developing the testing of the new commerce platform and executing the testing of the new commerce platform, and wherein the predicting comprises:

consuming, by the estimation API, a first endpoint produced using the first machine learning algorithm; and consuming, by the estimation API, a second endpoint produced using the second machine learning algorithm.

2. The computer-implemented method of claim 1, further comprising:

displaying, by the test prediction service on a display of a user device, (i) total needed resources for testing of the new commerce platform and (ii) historical total needed resources for previous testing of at least one other commerce platform associated with the service provider network.

3. A method comprising:

receiving, at a prediction service within a service provider network, information related to a new commerce platform within the service provider network;

prior to launching of the new commerce platform, determining, by the prediction service, (i) needed first resources for a test project for testing of the new commerce platform and (ii) needed second resources for the test project for testing of the new commerce platform, wherein the needed first resources comprise services of the service provider network to be consumed during the testing, and wherein the needed second resources comprise a number of individuals and a corresponding amount of time of the number of individuals to be active in developing the testing of the new commerce platform and executing the testing of the new commerce platform;

based at least in part on (i) the information related to the new commerce platform within the service provider network and (ii) the needed first and second resources for the test project for testing of the new commerce platform, predicting, by an estimation application programming interface (API) of the prediction service, an estimated cost associated with the needed first and second resources to perform the test project for testing of the new commerce platform; and based at least in part on the estimated cost, at least one of (i) prioritizing lower cost tests, (ii) scheduling usage of programs and services of the service provider network, (iii) adding a first test to the test project, (iv) removing a second test from the test project, (v) cancelling the test project, or (vi) cancelling the launching of the new commerce platform, wherein a first set of data obtained from a first service of the service provider network is utilized for training a first machine learning algorithm utilized by the test prediction service for determining the services of the service provider network to be consumed during the testing, wherein a second set of data obtained from a second service of the service provider network is utilized for training a second machine learning algorithm utilized by the prediction service for predicting the number of individuals and the corresponding amount of time of the number of individuals to be active in developing the testing of the new commerce platform and executing the testing of the new commerce platform, and wherein the predicting comprises:

consuming, by the estimation API, a first endpoint produced by a first machine learning algorithm; and consuming, by the estimation API, a second endpoint produced by a second machine learning algorithm.

4. The method of claim 3, wherein the first and second machine learning algorithms are from a group comprising linear regression, logistic regression, k-nearest neighbors, support vector machines, naive bayes, decision tree, random forest, or k-means clustering.

5. The method of claim 3, further comprising:

displaying, by the prediction service on a display of a user device, total needed resources for testing of the new commerce platform.

6. The method of claim 5, further comprising:

displaying, by the prediction service on the display of the user device, historical total needed resources for previous testing of at least one other commerce platform associated with the service provider network.

7. The method of claim 3, further comprising:

displaying, by the prediction service on a display of a user device, a trend of needed resources for testing of the new commerce platform.

8. The method of claim 7, further comprising:

displaying, by the prediction service on the display of the user device, factors to adjust to reduce an amount of the needed resources.

9. One or more computer-readable media storing computer-executable instructions that, when executed, cause one or more processors to perform operations comprising:

receiving, at a prediction service within a service provider network, information related to a new commerce platform within the service provider network;

prior to launching of the new commerce platform, determining, by the prediction service, (i) needed first resources for a test project for testing of the new commerce platform and (ii) needed second resources for the test project for testing of the new commerce platform, wherein the needed first resources comprise services of the service provider network to be consumed during the testing, and wherein the needed second resources comprise a number of individuals and a corresponding amount of time of the number of individuals to be active in developing the testing of the new commerce platform and executing the testing of the new commerce platform;

based at least in part on (i) the information related to the new commerce platform within the service provider network and (ii) the needed first and second resources for the test project for testing of the new commerce platform, predicting, by an estimation application programming interface (API) of the prediction service, an estimated cost associated with the needed first and second resources to perform the test project for testing of the new commerce platform; and based at least in part on the estimated cost, at least one of (i) prioritizing lower cost tests, (ii) scheduling usage of programs and services of the service provider network, (iii) adding a first test to the test project, (iv) removing a second test from the test project, (v) cancelling the test project, or (vi) cancelling the launching of the new commerce platform, wherein a first set of data obtained from a first service of the service provider network is utilized for training a first machine learning algorithm utilized by the test prediction service for determining the services of the service provider network to be consumed during the testing, wherein a second set of data obtained from a second service of the service provider network is utilized for training a second machine learning algorithm utilized by the prediction service for predicting the number of individuals and the corresponding amount of time of the number of individuals to be active in developing the testing of the new commerce platform and executing the testing of the new commerce platform, and wherein the predicting comprises:
consuming, by the estimation API, a first endpoint produced by a first machine learning algorithm; and
consuming, by the estimation API, a second endpoint produced by a second machine learning algorithm.

10. The one or more computer-readable media of claim 9, wherein the operations further comprise:
displaying, by the prediction service on a display of a user device, (i) total needed resources for testing of the new commerce platform and (ii) historical total needed resources for previous testing of at least one other commerce platforms.

11. The one or more computer-readable media of claim 9, wherein the operations further comprise:
displaying, by the prediction service on a display of a user device, a trend of needed resources for testing of the new commerce platform.

12. The one or more computer-readable media of claim 11, wherein the operations further comprise:
displaying, by the prediction service on the display of the user device, factors to adjust to reduce an amount of the needed resources.

\* \* \* \* \*